United States Patent [19]

Freeman

[11] 3,919,773

[45] Nov. 18, 1975

[54] DIRECT MOLDABLE IMPLANT MATERIAL

[75] Inventor: Frank Hubert Freeman, Farmington, Mich.

[73] Assignee: Sybron Corporation, Rochester, N.Y.

[22] Filed: Dec. 20, 1973

[21] Appl. No.: 426,899

[52] U.S. Cl..................... 32/10 A; 32/15; 128/92 C
[51] Int. Cl.$^2$......................................... A61C 13/00
[58] Field of Search............ 32/10 A, 15; 128/92 C, 128/92 CA; 3/1.9–1.93, 1

[56] References Cited
UNITED STATES PATENTS

| | | | |
|---|---|---|---|
| 3,314,420 | 4/1967 | Smith et al........................ | 32/10 A |
| 3,605,123 | 9/1971 | Hahn ................................ | 32/10 A |
| 3,740,850 | 6/1973 | Bowen et al...................... | 32/15 |
| 3,862,920 | 1/1975 | Foster et al...................... | 32/15 |

Primary Examiner—Louis G. Mancene
Assistant Examiner—J. O. Lever
Attorney, Agent, or Firm—Theodore B. Roessel; Roger Aceto

[57] ABSTRACT

A direct dental implant composition and placement method is disclosed. In the present method a moldable, polymerizable material is inserted into the tooth socket immediately after the tooth has been extracted. Being moldable, the material conforms to and substantially fills the socket. Prior to inserting the moldable material into the socket, the surface of the material is coated or dusted with particulate calcium sulfate which becomes embedded in the outer surface of the moldable material adjacent the wall of the tooth socket when the implant material is placed in the tooth socket. The particulate is dissolvable in body fluids so that eventually minute voids develop in the outer surface of the hardened or set implant. These voids promote tissue attachment to firmly anchor the implant. Thereafter, a crown or other suitable restoration may be applied to the implant.

In another embodiment, a mechanical device is inserted into the material prior to hardening to provide a mechanical anchor for a crown or other appliance.

Also disclosed is a modification permitting use of the material as a bone cement for the fixation of orthopedic appliances or as a bone implant to replace missing bone, reinforce weakened bone tissue or reshape malformed bone structure.

17 Claims, No Drawings

DIRECT MOLDABLE IMPLANT MATERIAL

BACKGROUND OF THE INVENTION

The present invention relates to a dental method and composition and more specifically to a method and composition for a direct dental implant.

Implant materials and procedures for tooth replacement or reinforcement are well known in the art. Generally, the prior art employed either of two techniques for dental implant. In the first technique, the tooth socket was shaped to receive a pre-fired ceramic, vitreous carbon or metallic insert. In the second technique an impression of the tooth extracted was taken and this impression used in the construction of a tooth replica to be used as an implant restoration. Adeptation of the implant to the socket is easily obtained in this technique, since the implanted tooth (usually a plastic material) is an exact replica of the extracted tooth. However, this procedure involved a delay of a minimum of 30 minutes between the time the tooth was extracted and the implant inserted.

The primary objection to the first technique is, of course, the loss of hard tissue or bone when the tooth socket is shaped to receive the implant and the technique is limiting or prohibitive altogether where adjacent implants are required. Furthermore, studies have shown that implants accomplished in this fashion are not successful. One possible reason for the failure, is that with the implant in physical contact with the bone, all the shock and force of mastication are transmitted through the implant directly to the underlying bone surface. This eventually leads to damage, resorption and loss of bone with subsequent failure of the implant.

The primary disadvantage of the second method, is of course, the delay between the time the tooth is extracted and the implant inserted. This delay is a minimum of 30 minutes during which time the patient is confined to the dental chair or surgical table. Further, while this method did not result in the immediate loss of bone tissue as in the case where the tooth socket was shaped to fit the implant, it was found that the implants failed frequently for other reasons. For example, implants of this type are usually made from a plastic material such as polymethylmethacrylate. It was found that the smooth surface presented by this plastic implant discouraged the attachment of tissue to the implant.

In natural teeth, a membrane, known as the periodontal membrane, between the tooth and the bone of the tooth socket allows for functional movement of the tooth. This membrane, then, acts as a shock absorber to prevent the impact and shock of mastication from being transmitted directly to the underlying bone. The fibers of this membrane run generally perpendicular to the natural tooth and the bone of the tooth socket. Where smooth plastic implants are used, however, it was found that the fibers of this membrane tended to run in a more parallel orientation to the implant surface and failed to function as a periodontal membrane.

To overcome this problem of tissue attachment, various foaming agents where incorporated into the plastic compositions so that the dental implant was porous. The pores at the surface of the implant permitted the invasion and proper orientation of the periodontal membrane fibers for more normal function and for more firmly securing the implant in the socket. The use of a porous implant, however, has two drawbacks. First, if the implant is porous throughout, the connective tissue of the periodontal membrane may penitrate beyond the surface of the implant and become cut off from its supply of nourishment resulting in death and putrification of the tissue within the implant.

The second drawback is the control of pore size at the surface of the implant. It is well known that pores size influences the type of tissue growth which his promoted. For example, a pore size on the order of 100 microns or larger will permit the tissue to mineralize or calcify forming a hard unresilient connection or ankylosis of the implant and the bone of the tooth socket. A pore size of say, 15 to 50 microns, on the other hand promotes the formation of soft, resilient connective tissue between the implant and the bone of the tooth socket.

Thus, when foaming agents are mixed with the implant forming materials, the difficulty in controlling the porosity of the implant and the pore size at the surface of the implant are two factors which detract from the use of such a technique.

The present invention seeks to overcome the disadvantages of prior art implant compositions and procedures by providing a moldable implant material, which is polmerizable in situ. This material is inserted into the tooth socket immediately after the tooth has been extracted. Because the material is moldable, it readily conforms to the size and shape of the tooth socket. The exterior surface of this moldable material is dusted or otherwise provided with a particulate which becomes absorbed by the body after the mineral has polymerized, leaving pores on the surface of the implant of a size sufficient to promote growth of the desired connective tissue.

SUMMARY OF THE INVENTION

The composition and method of the present invention may be characterized in one aspect thereof, by the provision of a moldable, polymerizable material which when hardened is capable of acting as the base for a dental crown or other suitable restoration, the exterior of the material being dusted or coated with a particulate of a preselected size and which is biologically acceptable and soluble in body fluids. The implant method of the present invention, which preferably takes place immediately after tooth extraction, involves the steps of mixing a two part formulation to produce a moldable, polymerizable material; forming the moldable polymerizable material to approximate the size and form of the extracted tooth; dusting the outer surface of the material with particulate of a preselected size, the particulate being a biologically acceptable substance dissolvable in body fluids; and then inserting the preformed implant into the tooth socket so that the particulate is embedded in the surface of the implant material between the material and the walls of the tooth socket. After the subsequent hardening of the implant material, the particulate is dissolved by the body fluids leaving pores of a desired size on the surface of the hardened implant sufficient to promote the attachment of connective tissue. The attachment of hard tissue (bone) or soft connective tissue can be encouraged by the suitable selection of the size of the particulate used to coat the outside of the preformed, but unpolymerized implant.

OBJECTS OF THE INVENTION

One object of the present invention is to provide a composition and method for direct dental implant which minimizes tissue loss and patient trauma.

Another object of the present invention is to provide a material and method which permits the quick processing of a dental implant under operating room conditions without the need for prolonged "open wound" procedures or subsequent operations.

Still another object of the present invention, is to provide a dental implant material which is biologically compatible and which is structurally strong enough to form the basis for a crown or other suitable dental restoration.

Another object of the present invention is to provide a composition and method for prouducing a dental implant which promotes the attachment of soft connective tissue to firmly anchor the implant in the tooth socket.

Yet another object of the present invention is to provide a composition and method for producing dental and/or medical bone replacement or bone augmentation implants which promote the attachment of hard tissue (bone) to the implant.

These and other objects, advantages and characterizing features of the present invention will become apparent upon consideration of the following detailed description thereof.

DESCRIPTION OF THE PREFERRED EMBODIMENTS

According to the present invention, the implant material is first mixed and formed. The material can be any of the well known polymerizable, biologically campatible, thermosetting organic resin based restorative systems commonly used for dental restoration purposes. These systems are usually formed of a synthetic, organic resin matrix and a silane coupled inorganic filler which adds crushing or compression strength to the restoration.

A typical dental restoration material consists of a first component which includes a monomer and an initiator, and a second component which consists of a free radical forming catalyst. The inorganic filler can be mixed with either of these two components or can be divided between them.

One common restoration material of this type uses a BisGMA resin as the monomer. The initiator for producing free radicals may be any of the familiar types used in dental restorative compositions such as N, N, 3, 5 tetra-methylaniline (DMDA), a tertiary amine such as di-methyl-para-toluidene, 2, 2' (p tolylimino diethanol), or 2, 2'-(m tolylimino diethanol). The catalyst commonly used is benzoyl peroxide.

Any suitable inorganic filler may be used to add strength to the polymerized material. For example, fused silica is quite commonly used for such purposes in dental restorations. For purposes of the present invention, however, a mixture of an alkaline radiopaque glass and an alkaline ceramic has been found to improve the biocompatibility of the implant and to make it more bone like. Additions of silane coupled glass or ceramic fibers may be made to improve the toughness of the implant and make it more bone like.

It is also common in the dental restoration art to treat the inorganic filler with a silane coupling agent, such as gamma-methacryloxypropyltrimethoxy silane. This acts as a coupling agent for the particles of the inorganic filler to the resin matrix to improve the crushing strength of the restoration.

Thus, in the method of the present invention, a moldable, polymerizable material is prepared in the same manner as material heretofore used for filling teeth. Once the material has been prepared and while the material is still moldable, it is rolled in, dusted, or otherwise coated with a particulate so that the particulate becomes embedded in the outer surface of the material. The particulate must be biologically acceptable and soluble in body fluids. Examples of suitable materials meeting these requirements include calcium sulfates, tri calcium phosphate, poly vinyl alcohol, gelatin, surgical gut, collagen, cynoacrylate or other soluble acrylic, polylactic acid or polyglycolic acid. The preferred material is calcium sulfate which may be in the form of $CaSO_4$, $CaSO_4 \cdot \frac{1}{2} H_2O$ or $CaSO_4 \cdot 2H_2O$. Preferably, the particle size of the particulate should be sufficient to pass a 325 U.S. mesh screen. This would provide a particle size no larger than 44 microns. A larger or smaller particle size may be desired for purposes set out herein below.

Once the mass of moldable, polymerizable material has been coated with the particulate, the coated material is inserted into the tooth socket. This preferably occurs as soon as possible, if not immediately, after tooth extraction. Since the material is moldable, it easily fills and conforms to the shape of a tooth socket. As the material is pushed into the tooth socket the particulate is retained on the outer surface of the implant material, along the implant-tooth socket interface.

Polymerization of the moldable material is complete after a few minutes. Over a period of time, however, the body fluids dissolve the particulate material from the surface of the implant leaving the surface of the hardened implant covered with a series of pores. This porous surface, where each pore is on the order of 44 microns or less, promotes the attachment of connective tissue for firmly anchoring the implant in place.

One of the advantages of inserting a moldable implant material into the tooth socket, aside from the time factor and the ease of conforming the implant to the socket, is that portions of the implant above the gum line can be molded around and against the teeth next adjacent the extraction. When hardened, this implant material maintains the separation between the teeth and prevents "drift" or tooth movement which normally occurs when a tooth is extracted. Thus, the composition and method of the present invention retains the normal oral geometry intact during the healing period and the implant becomes self stabilized. The exposed implant material may then be removed or shaped to receive a crown or other suitable restoration at some later date To demonstrate the present invention, a conventional monomer for dental restoration purposes was prepared by reacting the diglycidalether of bisphenol-A and a methacrylic acid to obtain a BisGMA monomer. It is important that the amounts of the reactants be stoichiometrically balanced to insure that no unreacted or residue amounts of either material remain in the monomer. It is believed that any residue could adversely effect the biological acceptance of the implant. The BisGMA monomer was then mixed with a 2, 2'- (m tolylimino diethanol) to form a first component of the moldable implant material comprising 98–99.8% BisGMA resin and 0.2–2%, 2, 2'- (m tolylimino diethanol).

The second component of the implant material consists of a catalyst and any of the well-known reinforcing filler materials with or without a radiopaque filler. It is preferable that the filler or fillers be treated with silane which serves as a coupling agent to enhance the reinforcing capabilities of the filler system. It is also preferred that the filler be alkaline as it is believed that an alkaline implant-tissue interface is important in achieving biological compatibility of the implant. In the present invention, both a silanated radiopaque glass and a silanated ceramic filler were used together with a catalyst to form a second component comprising: 69.6%, $LiO_2$—$Al_2O_3$—$SiO_2$ (ceramic); 30%, BaO—$Al_2O_3$—$SiO_2$ (glass); and 0.4%, Benzoyl peroxide (catalyst).

Specifically the glass and ceramic had the following compositions:

| Ceramic | | Glass | |
|---|---|---|---|
| $Li_2O$ | 14% | $AlO_3$ | 22.4% |
| $Al_2O_3$ | 33% | $SiO_2$ | 32.6% |
| $SiO_2$ | 50% | BaO | 45.8% |

A portion or all of the $LiO_2$—$Al_2O_3$—$SiO_2$ ceramic, may be replaced with silanated glass, ceramic, mineral fibers or carbon fibers to improve the tensile strength and toughness of the polymerized implant material thus giving the implant more "bone-like" properties.

The first and second components were then mixed together in the ratio of 1 to 3 in order to provide the moldable, polymerizable, dental implant material. Such a moldable material will polymerize to a structurally strong mass within 3 to 10 minutes from the start of the mix.

The mixing ratios of the first and second components will vary with the amount, type and characteristics of the specific fillers used in the composition.

The third component of the implant material comprised a 325 mesh reagent grade $CaSO_4$—$2H_2O$. Such a particulate meets the requirement set out above, namely, it is biologically acceptable, soluable in body fluids and is of a size selected to provide the desired pore size.

After the first and second components were mixed to form a moldable material, the material is rolled to a ball, cone or other convenient shape and then dusted with, or otherwise coated with the third component, particulate calcium sulfate. Either before or after the coating process, the mass of moldable material may be hand formed to a generally coned-shaped configuration to facilitate insertion of the material into the tooth socket. The powdered implant material is then pressed into the tooth socket.

In order to insure that the implant completely fills and conforms to the tooth socket, a rod or plunger can be pressed into and nearly through the implant material to the apex of the cone. The upper end of the plunger is then moved in a circular motion so that the rod moves through a conical path of travel. This condenses the powdered implant material surface against the tooth socket wall and insures that the implant material fills all corners of the tooth socket. In addition, this causes the particulate to be retained on the outer surface of the implant at the interface between the material surface and the wall of the tooth socket. The plunger is then removed and the excess implant material condensed into the cavity created by the plunger. Care is excercised to retain the powdered implant material surface against the socket wall, as it is important that a coating of soluble powder be retained at the implant-socket wall interface.

Various techniques can be used from this point. In one technique, the excess implant material is simiply molded against and around the teeth adjacent the extraction. With this arrangement, the hardened implant material will bear against the adjacent teeth to keep these teeth from drifting thereby maintaining the natural oral geometry. This condition can be maintained for a period of time or until the excess implant material is removed and the remaining material is shaped or otherwise prepared for receiving a permanent crown, cap or other appropriate dental restoration, after healing has been achieved.

In another technique the tooth socket only is filled with moldable material and no excess of material is brought to bear against adjacent tooth surfaces. In this situation, a metal pin or internally threaded socket may be pressed into the center of the moldable implant material. Once the implant material has hardened, this pin or socket then becomes the anchor point to which a crown, cap or other suitable restoration may be attached.

Regardless of which of the foregoing techniques are employed, the implant material itself, as set out herein above, hardens within 3 to 10 minutes. Over a period of time, the particulate which is located at the implant-socket wall interface is dissolved by the body fluid leaving the outer surface of the implant covered with a plurality of pores ranging in size up to 44 microns. In this manner, the implant is provided with a surface porosity of a selected and controlled size sufficient to establish tissue attachment to the implant. Since the particulate is capable of passing a 325 mesh screen, there are no particles and therefore no pores in the range of 100 microns or larger to permit mineralization of the attaching tissue. Instead, a controlled pore size is selected to restrict the tissue mineralization process while promoting soft tissue attachments which more nearly approximates the tissue attachments to natural teeth.

In some instances, mineralization of the tissue adjacent the implant is desirable. In such cases, the size of the particulate may be selected to produce pores on the surface of the implant larger than 100 microns. An example of such an instance, is where the implant is used to correct a defect or repair an injury to the bone. In this respect, since the implant material when first mixed is moldable, it can be used in the reconstruction of the alveolar ridge. The material itself, will provide a direct moldable contouring mass which can be attached to the ridge. The molding flexibility of the material permits rebuilding of the ridge to the exact requirements of the individual case. In such a process, a direct attachment to the bone is desirable so that the outer surface of the materials would be coated with a particulate on the order of 100 microns or larger to promote the mineralization of the connective tissue.

It should also be appreciated that in the present invention it is possible to control not only the size of the pores at the surface of the implant, but also the distribution of pores of different sizes. For example, in some instances, it may be desired to have a soft tissue attachment at some portion of the implant while having a mineralized or hard tissue attachment at another portion of the implant. This can be easily accomplished in the present invention by simply coating or otherwise providing on the surface of the moldable material, particulate of one size at one portion of the material and particulate of another size at a different portion of the material.

While the present invention has been described primarily in connection with dental implants, it is readily apparent that the present invention would have also application in the medical field and in particular in connection with bone implants to replace missing bone, reinforce weakened bone tissue or reshape malformed bone structure. In this respect, the use of a coarse particulate on the order of 100 microns or larger on the bone-implant interface will encourage bone ingrowth to anchor the implant firmly to the bone. On the other hand, use of a finer particulate on the order of 50 microns or less on the soft tissue-implant interface will encourage soft tissue attachment to the implant. In this way, the attachment of bone implants is achieved without the use of any metallic fixative.

Present implant procedures to replace missing or deficient bony structure or to reinforce bony structure relay upon ceramic, carbonaceous or metallic structural elements, which were prefabricated to the approximate size and contour desired. Exact adaptation to the existing bone structure is not generally possible and fixation is generally achieved by wedging the device into a prepared undersize site or by nails, screws, wires or rods. The lack of adaptation to the natural tissues and the high stress concentrations near the points of fixation frequently overtax the supporting tissues, resulting in tissue resorption, loosening, infection and implant failure. The mis-match of moduli between the natural tissues and the implant materials also contribute to this pattern of implant failure.

The present invention overcomes many of the deficiencies of the high modulus implant materials. Being directly moldable, it gives faithful adaptation to the supporting structures. Temporary fixation can be accomplished without any metallic device by simply drilling shallow undercut retaining holes which are easily filled with the moldable polymerizable composition. The ultimate fixation is achieved by the natural ingrowth of both soft and hard tissues into the surface pores established by the selected fine and coarse soluable particulate surface coating described herein above. This gives a broad based stress distribution system, thereby avoiding localized high stress areas and the overloading of the supporting tissues.

Use of the direct moldable implant system of the present invention as a bone cement is also possible and involves only a reduction in filler loading to increase the fluidity of the mixed but unset composition. In the present state of the art, methylmethacrylate compositions are used to cement orthopedic appliances into the supporting bone structure. The prepared mixes are placed around the appliance, within the bone cavity and allowed to polymerize in situ. Two major problems associated with the use of methylmethacrylate compositions are the systemic toxic reactions which appear to be related to the high volatility and high mobility of methylmethacrylate monomer, and the tissue damage resulting from the high exothermal heat of the polymerization of methylmethacrylate.

In the present invention, however, the low resin volatility low resin mobility and low curing exotherm coupled with the biological compatability of the system make the system particularly attractive for use as a "bone cement" for the fixation of orthopedic appliances.

Thus, it should be appreciated that the implant material and method of the present invention accomplishes its intended objects in providing an implant material which can be inserted into the tooth socket immediately after the tooth extraction. The material being moldable, quickly and easily conforms to the shape of and completely fills the tooth socket. When hardened, the material provides a firm basis for anchoring a crown, cap or other suitable restoration. Furthermore, the porosity of the surface of the implant may be controlled without having a like porosity internal of the implant. Dusting or otherwise coating the surface of the implant material with a particulate of the desired size having the characteristics of being biologically acceptable and soluable in body fuids insures that after the material is hardened, pores of the correct size necessary to promote the type of tissue growth desired will form at the surface of the implant as the particular material is dissolved by the body fluid. In medical applications, the implant material of the present invention is readily adaptable for use as a "bone cement" or as a bone implant material to repair or replace bony structure.

Having thus described the invention in detail, what is claimed as new is:

1. A moldable, direct dental implant material insertable into a tooth root socket immediately after tooth extraction for polymerizing in situ, comprising a polymerizable, thermosetting organic resin binder, an inorganic filler admixed wtih said binder and a particulate coating the outer surface of said moldable material, said particulate being biologically acceptable, soluble in body fluids and of a particle size sufficient to produce pores of preselected size in the outer surface of said implant material when said particulate is dissolved by body fluids after said implant material is hardened.

2. An implant material as in claim 1 wherein substantially all of said particulate is capable of passing a 325 U.S. standard mesh screen.

3. An implant material as in claim 1 wherein said particulate is selected from the group consisting of surgical gut, gelatine, polyvinyl alcohol, collagen, cynoacrylate and calcium sulfate.

4. An implant material as in claim 1 wherein said particulate $CaSO_4$ is selected from the group consisting of $CaSO_4.\frac{1}{2} H_2O$ and $CaSO_4.2H_2O$.

5. An implant material is in claim 1 wherein one portion of the surface of said material is coated with a finer particle size of said particulate than another portion of the surface of said material.

6. An implant material as in claim 1 wherein said resin binder is the reaction product of the diglycidal ether of bisphenol A and methacrylic acid, the amounts of the diglycidal ether of bisphenol A and methacrylic acid being stoichimetrically balanced to insure the absence of any residual, unreacted reactants.

7. A process for direct dental implant comprising the steps of:
   a. forming a mass of moldable, polymerizable thermosetting resin which upon hardening is biologically acceptable;
   b. placing a particulate on the outer surface of said mass, said particulate being soluble in body fluids and biologically acceptable; and
   c. inserting said material into a tooth socket immediately after tooth extraction so that said moldable material fills and assumes the shape of the tooth socket with said particulate becoming embedded in the outer surface of said moldable material at the material surface-tooth socket wall interface.

8. A process according to claim 7, wherein substantially all of said particulate is of a size sufficient to pass a 325 U.S. standard mesh.

9. A process according to claim 7, wherein said particulate is selected from the group consisting of surgical gut, gelatine, poly vinyl alcohol, collagen, cynoacrylate and calcium sulfate.

10. A process as in claim 7, wherein said particulate $CaSO_4$ is selected from the group consisting of $CaSO_4 \cdot \frac{1}{2} H_2O$ and $CaSO_4 \cdot 2H_2O$.

11. A process as in claim 7, wherein said mass of moldable polymerizable thermosetting resin is formed by admixing.

a liquid constituent comprising BisGMA and a polymerization initiator and;

a powder contituant comprising said inorganic filler and a free radical forming catalyst.

12. A process as in claim 11 wherein, said inorganic filler is a mixture comprising about 70% of a finely divided $Li_2 O—Al_2O_3—SiO_2$ ceramic, about 30% of a finely divided $BaO—Al_2O_3—SiO_2$ glass and a silane coupling agent.

13. A process as in claim 12 wherein said liquid and powder constituants are mixed in the ratio of about 1:3.

14. A process as in claim 11 wherein said BisGMA is the reaction product of the diglycidal ether of bisphenol A and methacrylic acid which are mixed in stoichiometric amounts calculated such that substantially all of said diglycidal ether of bisphenol A and methacrylic acid is consumed leaving substantially no residue of either.

15. A process as in claim 7, comprising the step of inserting a mechanical anchor into the unhardened material after said material has been inserted into the tooth socket.

16. A process as in claim 7 comprising the steps of:
a. inserting a rod into the unhardened material after said material has been inserted into the tooth socket; and
b. rotating said rod through a conical path to force the outer surface of said material into intimate contact with the walls of said tooth socket.

17. A material mixture for forming an implant within a cavity in the human body, said material being moldable to conform with the shape of the cavity and polymerizable in situ, said material comprising:
a. a polymerizable, thermosetting organic resin binder;
b. an inorganic filler admixed with said binder; and
c. a particulate solid coating the outer surface of said moldable material, said particulate being biologically acceptable, soluable in body fluids and of a particle size sufficient to produce pores of preselected size in the outer surface of said implant material when said particulate is dissolved by body fluids after said implant material is hardened, said particulate size and, therefore, said pore size being selected so as to promote the attachment of the desired tissue type to the hardened implant material in said body cavity.

* * * * *

UNITED STATES PATENT OFFICE
CERTIFICATE OF CORRECTION

Patent No. 3,919,773          Dated November 18, 1975

Inventor(s)  Frank Hubert Freeman

It is certified that error appears in the above-identified patent and that said Letters Patent are hereby corrected as shown below:

Column 1, line 16, change "Adeptation" to --Adaptation--.

Column 2, line 1, change "penitrate" to --penetrate--.
          line 7, change "his" to --is--.

Column 3, line 14, change "prouducing" to --producing--.
          line 32, change "campatible" to --compatible--.

Column 6, line 4, change "simiply" to --simply--.

Column 7, line 20, change "relay" to --rely--.
          line 42, change "soluable" to --soluble--.

Column 8, line 15, change "soluable" to --soluble--.
          line 15, change "fuids" to --fluids--.
          line 18, change "particular" to --particulate--.

Column 9, line 16, change "constituant" to --constituent--.
          line 18, change "contituant" to --constituent--.
          line 26, change "constituants" to --constituents--.

Column 10, line 23, change "soluable" to --soluble--.

Signed and Sealed this ninth Day of March 1976

[SEAL]

Attest:

RUTH C. MASON
Attesting Officer

C. MARSHALL DANN
Commissioner of Patents and Trademarks